(12) United States Patent
Wang et al.

(10) Patent No.: US 6,228,285 B1
(45) Date of Patent: *May 8, 2001

(54) METHOD FOR PROCESSING RIGID-CHAIN POLYMERS INTO STRUCTURAL MATERIALS

(75) Inventors: Chyi-Shan Wang, Beavercreek; Jar-Wha Lee, Hilliard, both of OH (US)

(73) Assignee: The University of Dayton, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,641

(22) Filed: Jun. 3, 1998

Related U.S. Application Data

(60) Provisional application No. 60/048,570, filed on Jun. 4, 1997.

(51) Int. Cl.[7] .......................... C09K 19/52; C09K 19/38; B32B 27/02; B29B 11/10
(52) U.S. Cl. .................... 252/299.01; 428/394; 428/395; 264/5; 264/13
(58) Field of Search .......................... 252/299.01, 182.33; 528/337; 428/394, 395; 264/2.2, 5, 13, 203, 211.22

(56) References Cited

U.S. PATENT DOCUMENTS

| 4,900,805 | 2/1990 | Arnold et al. | 528/337 |
| 4,900,806 | 2/1990 | Arnold et al. | 528/337 |
| 5,095,075 | 3/1992 | Arnold et al. | 525/432 |
| 5,492,666 | 2/1996 | Wang et al. | 264/204 |

OTHER PUBLICATIONS

CAPLUS 1990: 149452, 1990.*
Jenekhe et al., "Solubilization, Solution, and Processing of Aromatic Heterocyclic Rigid Rod Polymers in Aprotic Organic Solvents: Poly(p–phenylene–2,6–benzobisthiazoldiyl)(PBT)", Marcomoleclues 1989, 22, 3216–3222.*

* cited by examiner

Primary Examiner—Shean C. Wu
(74) Attorney, Agent, or Firm—Killworth, Gottman, Hagan & Schaeff, L.L.P.

(57) ABSTRACT

A method for processing thermally intractable rigid-chain polymers into shaped structural articles is provided. The method includes dissolving a rigid-chain polymer in sulfuric acid at a concentration and temperature sufficient to form a nematic liquid crystalline solution which is then formed into a shaped article and cooled to a solid. The solution undergoes a phase transformation upon cooling from a liquid crystalline phase to a solid phase containing crystal solvates. The method allows rigid-chain polymers to be formed into fibers, bulk structural components, fiber reinforced composites and other structural materials without undergoing significant shrinkage or deformation.

17 Claims, 2 Drawing Sheets

METHOD FOR PROCESSING RIGID-CHAIN POLYMERS INTO STRUCTURAL MATERIALS

CROSS REFERENCE TO RELATED APPLICATIONS

This application claims the benefit of U.S. provisional application Ser. No. 60/048,570, filed Jun. 4, 1997.

GOVERNMENT RIGHTS

The government has rights in this invention pursuant to Contract No. F33615-95-D-5044 awarded by the U.S. Air Force.

BACKGROUND OF THE INVENTION

The present invention relates to a method of making shaped articles from rigid-chain polymers, and more particularly, it relates to a method which utilizes a phase transformation of the rigid-chain polymer in a concentrated solution at elevated temperatures to form a wide variety of shaped articles including bulk components.

The use of organic polymers in the formation of structural materials has been desirable as such polymers can be melt processed at low temperatures, are environmentally stable, and are light in weight. However, such polymers are not suitable for high temperature use applications such as reinforcing fibers.

In recent years, high temperature, high-performance rigid-chain polymers have been developed by incorporating aromatic and heteroaromatic structures into the polymer backbone. Such rigid-chain, or rigid-rod, polymers include poly(p-phenylene benzobisthiazole) (PBT), poly(p-phenylene benzobisoxazole) (PBO) and poly(p-phenylene benzobisimidazole) (PBI), ladder polymers such as poly (imidazoisoquinolines) (BBL), extended-chain polymers such as poly(p-phenylene terephthalamide) (PPTA), poly(2, 5(6)benzothiazole) (ABPBT) and poly(2,5(6) benzimidazole) (ABPBI), as well as their functionalized derivatives such as benzocyclobutene-functionalized PBT and PPTA. These polymers have a thermal and thermooxidative stability up to 500° C. When subjected to elevated temperatures, they normally decompose but do not melt.

However, these thermally intractable rigid-chain polymers are soluble in strong acids, such as polyphosphoric acid (PPA), methanesulfonic acid (MSA) and sulfuric acid, as well as organic solvents with Lewis acids. It has been found that when these polymers are dissolved in such acids, the resulting solutions may be extruded and coagulated to form uniaxially oriented fibers and biaxially oriented films. However, while such fibers have excellent tensile properties, they have poor compressive strength due to the fibrillar structure of the fibers, which is weak in lateral interactions and tends to buckle under a compressive load. This poor axial compressive strength has prevented the rigid-chain polymer fibers from being used as reinforcing fibers in more advanced structural composites.

Further, it is difficult to process the thermally intractable rigid-chain polymers into other structural materials such as bulk structural components because the extraction of solvent from such large components is time consuming and often results in shrinkage and deformation of the components.

Accordingly, there is still a need in the art for an improved method of processing thermally intractable rigid-chain polymers into structural components such as fibers and bulk components which exhibit good compressive strength and which do not undergo shrinkage or deformation during formation.

SUMMARY OF THE INVENTION

The present invention meets that need by providing a method which utilizes a phase transformation process to enable thermally intractable rigid-chain polymers to be fabricated into a wide variety of shaped articles including fibers, films, monolithic structural components and fiber-reinforced composites for structural applications. The resulting articles exhibit good mechanical properties and undergo little or no shrinkage during formation.

In accordance with one aspect of the present invention, a method is provided for forming a shaped article in which a rigid-chain polymer is dissolved in a strong acid, preferably sulfuric acid ($H_2SO_4$), and heated to a temperature sufficient to form a nematic liquid crystalline solution. The solution is then formed into the desired shape and cooled to form a solid. The method also includes the removal of solvent from the solid which can be extracted by conventional coagulation and drying methods.

The rigid-chain polymer for use in the present invention is selected from the group consisting of poly(p-phenylene benzobisthiazole), poly(p-phenylene pyridobisimidazole), poly(p-phenylene terephthalamide), and derivatives thereof. Preferably, the rigid-chain polymer comprises poly(p-phenylene benzobisthiazole) (PBT). The polymer is preferably present in the solution at a concentration of at least about 7% by weight, and more preferably, at least about 20% by weight, that is, preferably within the range of about 7% to about 40%, and more preferably, from about 20% to about 40%.

The heating temperature varies depending on the polymer concentration and generally increases with an increase in concentration. For example, for a solution having a concentration of about 7% by weight, a temperature of from about 122–127° C. is preferred, while for a solution having a concentration of 20% by weight, a temperature of from about 180–200° C. is preferred.

We have found that with the method of the present invention, the rigid-chain polymer/$H_2SO_4$ solution undergoes a phase transformation from a liquid crystalline phase upon heating to a solid phase upon cooling which contains crystal solvates. Because of this phase transformation to a solid, the shaped article undergoes little or no shrinkage upon formation because the removal of solvent occurs when the article is in solid form.

In another embodiment of the invention, a method is provided for forming a fiber composite from a rigid-chain polymer in which a rigid-chain polymer is combined with fibers and dissolved in a strong acid (preferably $H_2SO_4$) and heated to form a nematic liquid crystalline solution. The solution is then formed into a composite and cooled to form a solid. Excess solvent may be extracted by conventional coagulation and drying methods as described above.

The fibers are preferably selected from the group consisting of glass, carbon, ceramic and heated-treated PBT fibers and may be provided in continuous or chopped form.

Preferably, the rigid-chain polymer is present in the solution in a concentration as described above.

The structural components formed by the process of the present invention have low temperature solution processability, good mechanical properties, high use temperature, and are lightweight. The structural components may be used in sporting goods applications, electronics assemblies, commercial and military aircraft and aerospace vehicles, automobiles, and construction materials.

Accordingly, it is an object of the present invention to provide a method of forming a wide variety of shaped articles from rigid-chain polymers. This, and other features and advantages of the present invention will become apparent from the following detailed description, the accompanying drawings, and the appended claims.

DETAILED DESCRIPTION OF THE PREFERRED EMBODIMENT

Figure 1A:
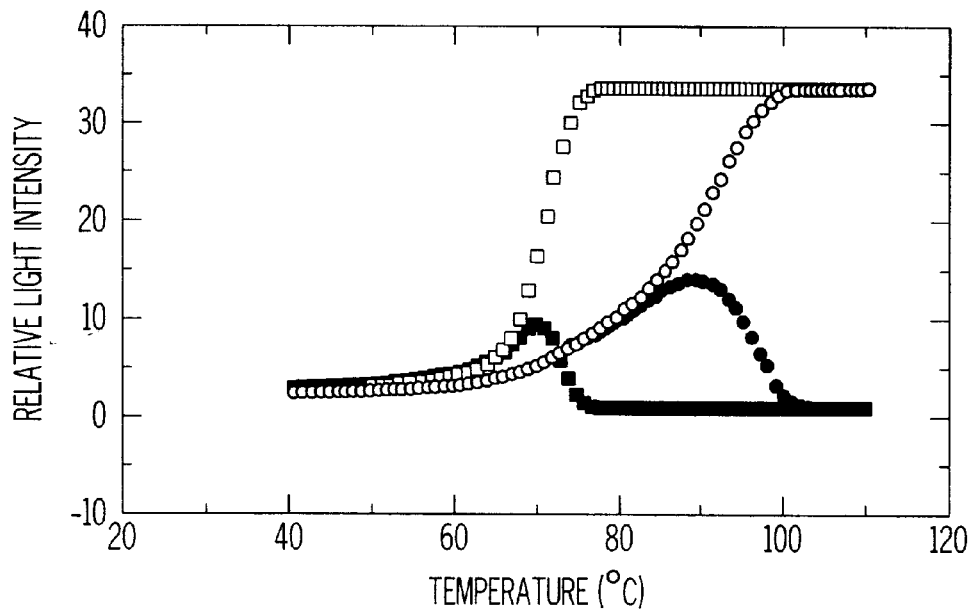
FIGS. 1A–1C are graphs illustrating the determination of the phase transformation temperature of varying concentrations of PBT/$H_2SO_4$ solutions based on the thermal transition revealed in their transmitted optical intensity.

The process of the present invention is based on the transformation which occurs when the concentrated rigid-chain polymer/$H_2SO_4$ solutions form a nematic liquid crystalline phase at elevated temperatures and undergo a rapid transformation into a solid phase upon cooling. Because of this phase transformation, previously unusable rigid-chain polymers can be processed into shaped articles by the same conventional melt processing techniques used for thermoplastic and thermosetting polymers such as extrusion and injection molding.

While not wishing to be bound to a particular theory, it is believed that the phase transformation which occurs in the method of the present invention imposes significant molecular orientation on the articles, i.e., the liquid crystalline solution is highly anisotropic such that when the phase transformation occurs, the crystal solvate which forms does not exhibit the properties of a solution, but rather behaves like a network of macroscopic crystals. Thus, the resulting shaped articles are self-reinforcing, i.e., their molecules are oriented in the form of a physical network. This provides the resulting articles, particularly bulk components, with good compressive strength.

In addition, because excess solvent is removed from the articles when they are in solid form (rather than in solution as with prior art methods), there is little or no shrinkage which occurs.

The preferred polymers for use in the present invention include poly(p-phenylene benzobisthiazole) (PBT, commercially available from SRI International), poly(p-phenylene pyridobisimidazole) (M5, commercially available from Akzo Nobel), poly(p-phenylene terephthalamide) (PPTA, commercially available from DuPont under the designation Kevlar®), and derivatives thereof. Other rigid-chain polymers may be used in the present invention as long as they exhibit the desired stability at the temperatures required to form the liquid crystalline solutions.

PBT polymers are preferred for use in the present invention because they have excellent thermal stability and chemical resistance, and their mechanical properties allow the polymers to be used in very stringent conditions. PBT components coagulated from solutions are porous, and the porosity of the components can be controlled by varying the solution concentration and rate of phase transformation. Components which can be made from PBT polymers include engine bushings, ducts, boards and panels for microelectronics applications, and membranes and hollow fibers for separation applications.

It should be appreciated that while bulk components may be formed from solutions having a high polymer concentration of about 20%, various other components may be formed using lower polymer concentrations. For example, high temperatures foams may be formed from solutions having a concentration range from below 1% to about 5%. The processing temperature also varies, depending on the polymer concentration. It should be appreciated that the mechanical properties of the shaped articles may be controlled by varying the processing conditions.

The preferred acid for use in the present invention is $H_2SO_4$, which we have found provides better results than other acids such as polyphosphoric acid (PPA) in that it allows a greater polymer concentration, i.e., more polymer can be dissolved in solution. For example, with PPA, a maximum concentration of 15 wt. % polymer can be used while sulfuric acid allows a concentration of up to 22 wt. %. In addition, $H_2SO_4$ is low in viscosity and is easy to process. However, it should be appreciated that $H_2SO_4$ may be used in combination with other acids such as polyphosphoric acid as long as $H_2SO_4$ is used as the primary acid.

The rigid-chain polymer solutions may be formed into fibers, bulk structural components, or fiber-reinforced composites using conventional methods such as extrusion, injection molding, and resin transfer molding. Once the shaped articles are formed, excess solvent may be removed by coagulation and drying to produce the final product. Preferably, the free sulfuric acid in the shaped articles is removed first by heat and vacuum prior to coagulation and drying to ensure their dimensional stability.

In order that the invention may be more readily understood, reference is made to the following examples, which are intended to be illustrative of the invention, but are not intended to be limiting in scope.

EXAMPLE 1

A high molecular weight PBT polymer was obtained from SRI International having an intrinsic viscosity of 16 dL/g, corresponding to a weight average molecular weight of 27,000 g/mol. The sulfuric acid (95% concentration) was obtained from Aldrich Chemical Corporation. It had been distilled under reduced pressure at 150° C. prior to use.

PBT/$H_2SO_4$ solutions over a concentration range from approximately 2 to 20 weight % were prepared in a closed glassware with mechanical stirring at elevated temperatures. The solutions upon cooling phase-transformed into a solid. The phase transformation temperature of these PBT solutions was determined to establish a phase diagram for forming structural components through solution phase transformation.

TABLE 1

| Concentration (wt %) | Phase Transformation Temp. (° C.) | Optical Characteristic |
|---|---|---|
| 1.99 | 34–41 | isotropic |
| 3.02 | 50–53 | isotropic |
| 4.01 | 70–77 | isotropic |
| 4.98 | 105–127 and 140–160 | isotropic |
| 5.99 | 112–120* and 160–180* | biphasic |
| 6.94 | 107–122* and 170–190* | biphasic |
| 7.80 | 100–110 and 122–127 | liquid crystalline |
| 9.02 | 100–110 and 122–127 | liquid crystalline |
| 10.1 | 100–110 and 120–126 | liquid crystalline |
| 11.7 | 137-140 | liquid crystalline |
| 14.7 | 150–152 | liquid crystalline |
| 19.1 | 168–176 | liquid crystalline |
| 20.2 | 178–183 | liquid crystalline |

*phase transformation temperature of the isotropic solution phase of the biphasic solution The phase transformation temperature of the PBT/$H_2SO_4$ solutions as a function of concentration was investigated using a polarized optical microscope (Leitz, Orthoux 2), a hot stage (Mettler, FP80HT), and a Mettler photomonitor. The PBT solutions were sandwiched between a glass slide and a cover glass and placed in the Mettler hot stage whose heating and cooling rate was programmed at 5° C./min. with a Mettler controller (FP82HT). The phase transformation of the PBT solutions was visually observed from the eye piece and photographed with the camera located on top of the microscope. The Mettler photomonitor and a strip chart recorder were used to measure and record the optical intensity transmitted through the sample during the heating and cooling cycles. The phase transformation temperature of the PBT/H$_2$SO4 solutions was determined based on the onset of thermal transition revealed in their transmitted optical intensity.

The PBT/H$_2$SO$_4$ solutions were optically transparent up to about 5 wt %. The yellowish solutions changed into a brownish solid when they were cooled to below their respective phase transformation temperatures. With a 4.01 wt % PBT/H$_2$SO$_4$ solution as an example, FIG. 1A shows the typical optical transmission pattern of transparent PBT solutions undergoing phase transformation upon cooling (squares) and heating (circles). The transparent 4.01 wt % solution showed a maximal optical transmission at high temperatures (open symbols). It began to show brownish whiskers upon cooling to approximately 75° C. The whiskers continued to grow in number and size with decreasing temperature until the entire solution transformed into a brownish solid. Accompanied with this phase transformation was an abrupt diminution in transmitted optical intensity of the solution. The initial optical diminution temperature was taken as the phase transformation temperature of the solution. The transformation from the brownish solid back to the transparent solution upon heating took place over a wide temperature range (about 40° C.) and the onset of this transformation was not clear.

With crossed polarizers (filled symbols), the 4.01 wt % solution did not show any optical transmission due to optical isotropy of the solution. When the solution was cooled to its phase transformation temperature (~75° C.), short segments of bright yellow lines started to appear on a completely dark background. They were light transmitted through ordered domains of PBT aggregates. As the aggregates grew larger and more ordered with decreasing temperature, the optical transmission became more intense. But along with the aggregate growth, the solution transformed into a nontransparent solid. As a result, the transmitted light intensity after reaching a maximum began to diminish with further decrease in temperature. In the heating cycle, the PBT/H$_2$SO$_4$ solid initially showed an increase in optical transmission with increasing temperature, but the optical transmission eventually diminished as the solid transformed into a transparent solution. Again the solution showed a wider transformation temperature range upon heating than cooling. The phase transformation temperature determined based on cooling the PBT solutions is listed in Table 1.

The PBT/H$_2$SO$_4$ solutions between 5 and 7.8 wt % concentrations were biphasic, i.e., a mixture of an isotropic (I) and a liquid crystalline (LC) solutions. The biphasic characteristic of these solutions was clearly shown in the optical microscope with crossed polarizers as bright and dark regions. When the biphasic solutions were given sufficient time at elevated temperatures without stirring, their two phases separated into two macroscopic domains. For example, the 5.99 and the 6.94 wt % PBT/H$_2$SO$_4$ solutions were found to form two layers in small jars. The more polymer-concentrated phase was at the top due to sulfuric acid being denser than PBT. This macroscopic phase separation was also observed in the hot stage, the liquid crystalline phase of the biphasic solutions migrated to the edge leaving the isotropic phase in the center of the hot stage.

Figure 1B:
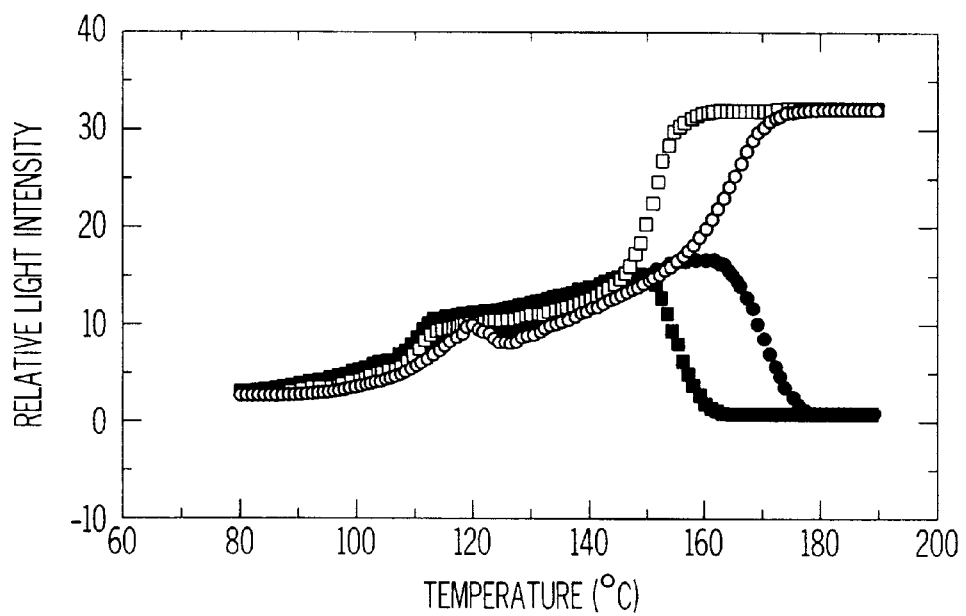

FIG. 1B shows the optical transmission of the isotropic solution that phase-separated from the biphasic 5.99 wt % PBT/H$_2$SO$_4$ solution. The isotropic solution, as expected, showed a maximum optical transmission without crossed polarizers (open symbols) and no optical transmission with crossed polarizers (filled symbols). It should be noted however, that this solution, although isotropic, was very close to the border of the biphasic region. It exhibited two phase transformations upon cooling, one at approximately 160° C. and the other at approximately 115° C. The transformation at 160° C. was due to a transition from the isotropic solution to a biphasic solution and the transformation at 115° C. was due to a second transition from the biphasic solution to a solid phase that contained an isotropic (I) solution and PBT/H$_2$SO$_4$ crystal solvates (CS). This I+CS phase is the same phase that isotropic PBT solutions transformed into.

Figure 1C:
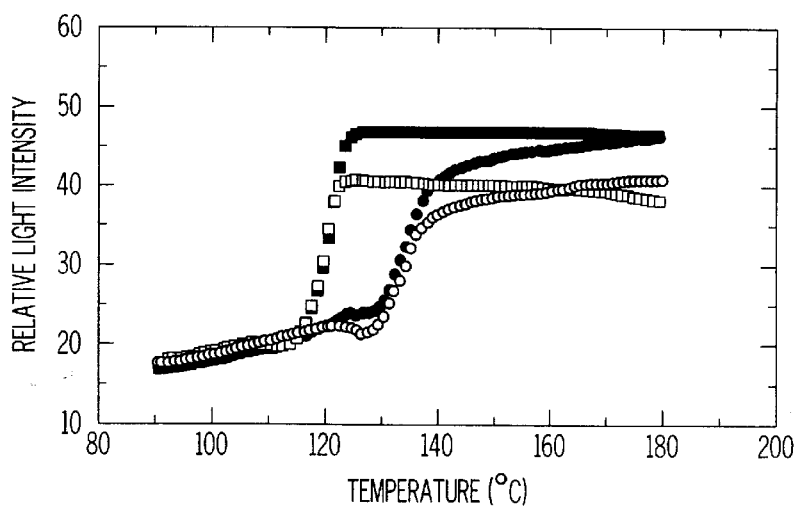

The PBT/H$_2$SO$_4$ solutions at and above 7.8 wt % concentration were nematic liquid crystalline as indicated by their optical birefringence and stir-opalescence. FIG. 1C shows the optical transmission of a liquid crystalline 9.04 wt % PBT/H$_2$SO$_4$ solution. Because the solution was in a highly ordered liquid crystalline state its optical transmission was significant even with crossed polarizers (filled symbols). This solution showed two transformations upon cooling (squares), a prominent one at about 122° C. and a subtle one between 100 and 110° C. The prominent phase transformation was from a liquid crystalline (LC) solution to a solid phase that contained a liquid crystalline (LC) solution and PBT/H$_2$SO$_4$ crystal solvates (CS). The subtle phase transformation was due to a further transition from the solid LC+CS phase to the solid I+CS phase. This second phase transformation became inappreciable for the PBT solutions at and above 12 wt % concentration. This might be due to the fact that the optical transmission of the highly concentrated PBT solutions in the LC+CS phase was already so poor that the reduction in optical transmission due to the further transformation to the I+CS phase could not be detected by the photomonitor. The temperature at which the PBT solutions transformed from the LC+CS to the I+CS phase is also included in Table 1.

Figure 2:
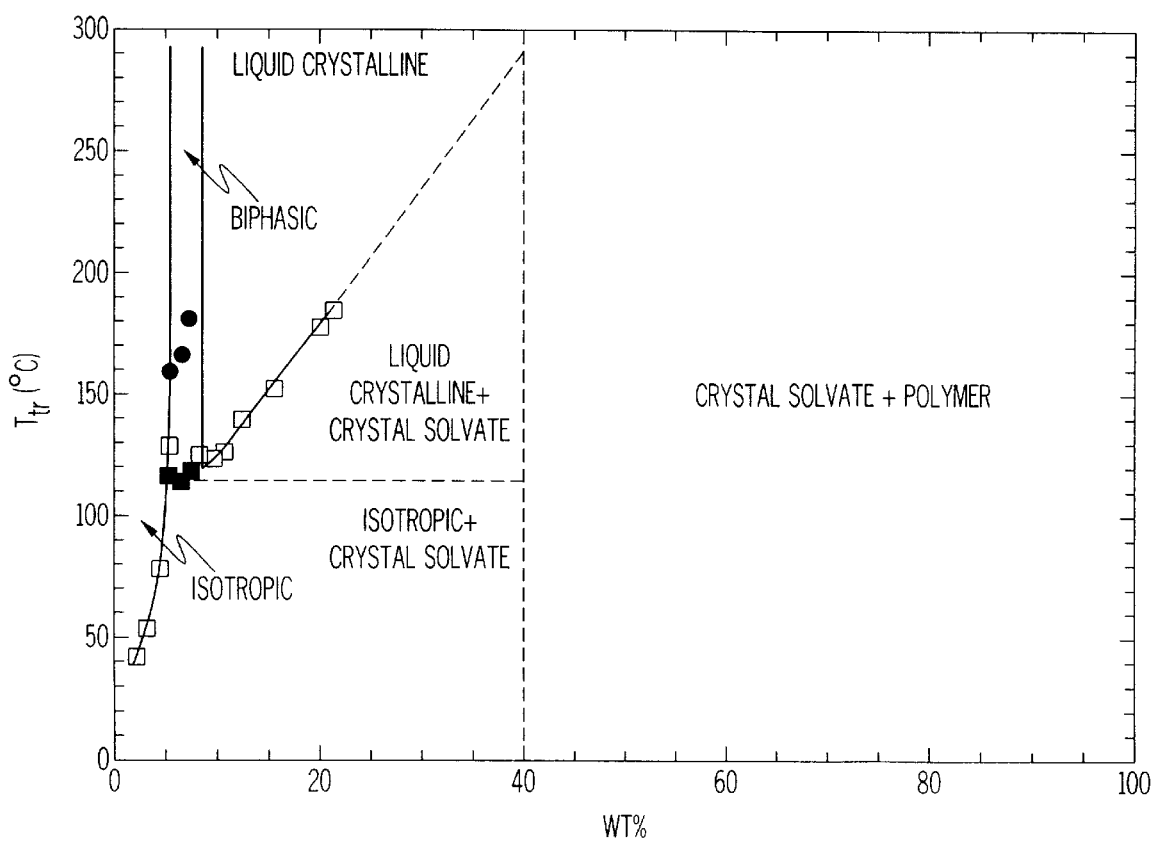
FIG. 2 is a phase diagram illustrating the phase transformation temperatures of varying concentrations of PBT/$H_2SO4$ solutions.

The phase diagram shown in FIG. 2 was constructed by plotting the phase transformation temperature (T$_{tr}$) listed in Table 1 against polymer concentration. As depicted in the phase diagram, the PBT/H$_2$SO$_4$ solutions are optically isotropic up to about 5 wt %. These isotropic solutions upon cooling to below their respective phase transformation temperatures pass into an I+CS phase, where they appear to be a solid. The PBT solutions are biphasic between a narrow concentration range from 5 to 7.8 wt %. The boundary between I and I+LC phases and that between I+LC and LC phases are steep, a small variation in concentration results in a large difference in phase transformation temperature. This is demonstrated by the large uncertainty (about 20° C.) in phase transformation temperature of the isotropic solutions on the border of biphasic region. Biphasic solutions also pass into the I+CS phase when being cooled to below their phase transformation temperature. The PBT/H$_2$SO$_4$ solutions are liquid crystalline (LC) at and above 7.8 wt % concentration. These solutions upon cooling move into a LC+CS phase first and then into the I+CS phase, in accord with the two phase transformations observed in FIG. 1C. It is understood that once liquid crystalline solutions pass into the LC+CS phase, they transform into a solid and their optical transmission is significantly curtailed.

The PBT solutions in the LC+CS and the I+CS phases appear to be a solid, which suggests that PBT/$H_2SO_4$ crystal solvates must have formed a three-dimensional network while the LC and the I phases simply cling to the network structure. For example, when 2.28 g of a 20 wt % PBT/$H_2SO_4$ solution was dried at 200° C. with nitrogen purge, it approached a constant weight of 1.08 g over a period of 88 hours. By taking the initially absorbed moisture into account, the remainder had a PBT content of about 40 wt %, a composition of 4 $H_2SO_4$ molecules per PBT monomeric unit. This suggests that the free sulfuric acid in the 20 wt % PBT/$H_2SO_4$ solution was removed by this exercise and the remainder was mostly PBT crystal solvates. It is believed that further drying the crystal solvates will lead to a crystal solvate (CS) and crystalline polymer (P) phase.

When the boundary between LC phase and LC+CS phase are extended to the crystal solvate and polymer (CS+P) phase, it reaches a temperature of about 280° C. It is believed that this may be the temperature at which the thermal energy of the system overcomes the chemical association between PBT and sulfuric acid in crystal solvates. Therefore, the PBT may become insoluble at this temperature in sulfuric acid and crystalline PBT may be produced.

EXAMPLE 2

Two PBT fibers were prepared, a control fiber from a 13.7 wt % PPA solution formed by a conventional extrusion and coagulation process and a phase-transformed fiber from a 20 wt % $H_2SO_4$/PPA solution formed in accordance with the process of the present invention. A modest 10% PPA was added to $H_2SO_4$ as co-solvent in order to reduce the corrosiveness of sulfuric acid at elevated temperatures. Other properties of the PBT/$H_2SO_4$ solution, such as low solution viscosity and phase transformation, were not affected.

The processing conditions and mechanical properties of the two PBT fibers are compared in Table 2. Both the polymer solutions were homogenized in a Haake Rheomixer at 190° C. for 6 hours prior to filtration, deaeration and fiber spinning. The fibers that were extruded, coagulated and dried are designated as as-spun fibers. The fibers that were also treated at 500° C. in nitrogen for 30 seconds under tension are designated as heat treated fibers. Preliminary tests indicated that the tensile strength and Young's modulus of the control fiber and the phase-transformed fiber were comparable, and that the axial compressive strength of the phase-transformed fiber is slightly higher than that of the control fiber.

TABLE 2

| PBT fibers: | Control fiber | Phase-transformed fiber |
| --- | --- | --- |
| PBT solution: | PBT/PPA | PBT/$H_2SO_4$/PPA |
| PBT viscosity (dL/g) | 25 | 25 |
| solvent | PPA(83% $P_2O_5$) | 90% $H_2SO_4$/10% PPA |
| Concentration (wt %) | 13.7 | 20 |
| Processing conditions: | | |
| Homogenization | 190° C./6 hrs in Haake | 190° C./6 hrs in Haake |
| Dearation (° C.) | 120 | 200 |
| Filtration | 74 μm mesh | 74 μm mesh |
| Spinning temp. (° C.) | 120 | 200 |
| Spinning pressure (psi) | 240–300 | ~100 |
| Take-up speed (ft/min) | 8–10 | 40 |
| Heat treatment: | | |
| Conditions | 500° C./$N_2$/30 sec | 500° C./$N_2$/30 sec |

TABLE 2-continued

| PBT fibers: | Control fiber | Phase-transformed fiber |
| --- | --- | --- |
| As-spun fiber: | | |
| Tensile Strength (Ksi) | 233 | 230 |
| Young's Modulus (Msi) | 24 | 18 |
| Comp. Strength (Ksi) | 55 | 60 |
| Heat treated fiber: | | |
| Tensile Strength (Ksi) | 263 | 283 |
| Young's Modulus (Msi) | 32 | 24 |
| Comp. Strength (Ksi) | 50 | 55 |

EXAMPLE 3

A chopped fiber composite of 30 wt % carbon fiber and 70 wt % PBT was prepared in accordance with the process of the present invention from a mixture of a carbon fiber and a 20 wt % PBT/$H_2SO_4$ solution. The chopped fiber composite had a density of 0.5 g/ml and was mechanically firm. It did not show any appreciable volume reduction after coagulation and drying. These results suggest that with the process of the present invention, thermally intractable rigid-chain polymers can be used as matrix resins to fabricate lightweight, high-performance structural composites.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of forming a shaped article from a rigid chain polymer comprising the steps of:
   providing a rigid-chain polymer;
   dissolving said polymer in sulfuric acid at a polymer concentration of about 20% and at a temperature of from about 180° C. to 200° C. to form a nematic liquid crystalline solution which will undergo a phase transformation; and
   forming said solution into a shaped article and cooling said article to form a solid; wherein, upon cooling, said solution undergoes a phase transformation from a liquid crystalline phase to a solid phase containing crystal solvates.

2. The method as claimed in claim 1 including the step of removing solvent from said solid.

3. The method as claimed in claim 1 in which said rigid-chain polymer is selected from the group consisting of poly(p-phenylene benzobisthiazole), poly(p-phenylene pyridobisimidazole), poly(p-phenylene terephthalamide), and derivatives thereof.

4. The method as claimed in claim 3 in which said rigid-chain polymer comprises poly(p-phenylene benzobisthiazole).

5. The method as claimed in claim 1 in which said acid comprises sulfuric acid.

6. A method of forming a shaped article from a rigid-chain polymer comprising:
   providing a rigid-chain polymer;
   dissolving said polymer in sulfuric acid at a polymer concentration of from about 20% to about 40% by weight and at a temperature of from about 180° C. to 200° C. to form a nematic liquid crystalline solution which will undergo a phase transformation; and forming said solution into a shaped article and cooling said article to form a solid, wherein, upon cooling, said solution undergoes a phase transformation from a liquid crystalline phase to a solid phase containing crystal solvates.

7. The method as claimed in claim 1 in which said shaped article undergoes little or no shrinkage upon formation.

8. A method of forming a fiber composite from a rigid-chain polymer comprising the steps of:

providing a rigid-chain polymer and fibers, dissolving said polymer in sulfuric acid at a polymer concentration of about 20% and at a temperature of about 180 to 200° C. to form a nematic liquid crystalline solution which will undergo a phase transformation and combining said fibers in said solution; and forming said solution into a composite and cooling said composite to form a solid, wherein, upon cooling, said solution undergoes a phase transformation from a liquid crystalline phase to a solid phase containing crystal solvates.

9. The method as claimed in claim 8 including the step of removing solvent from said solid.

10. The method as claimed in claim 8 in which said fibers are chopped.

11. The method as claimed in claim 8 in which said fibers are continuous.

12. The method as claimed in claim 8 in which said fibers are selected from the group consisting of glass, carbon, ceramic and heated-treated PBT fibers.

13. The method as claimed in claim 8 in which said rigid-chain polymer is selected from the group consisting of poly(p-phenylene benzobisthiazole), poly(p-phenylene pyridobisimidazole), poly(p-phenylene terephthalamide), and derivatives thereof.

14. A method of forming a fiber composite from a rigid-chain polymer comprising the steps of:

providing a rigid-chain polymer and fibers;

dissolving said polymer in sulfuric acid at a polymer concentration of from about 20% to about 40% by weight and at a temperature of about 180 to 200° C. to form a nematic liquid crystalline solution which will undergo a phase transformation and combining said fibers in said solution; and forming said solution into a composite and cooling said composite to form a solid, wherein, upon cooling, said solution undergoes a phase transformation from a liquid crystalline phase to a solid phase containing crystal solvates.

15. A method of forming a shaped article from a rigid-chain polymer comprising the steps of:

providing a rigid-chain polymer;

dissolving said polymer in a strong acid at a polymer concentration of about 20% and at a temperature of from about 180° C. to 200° C. to form a nematic liquid crystalline solution which will undergo a phase transformation;

forming said solution into a shaped article and cooling said article to form a solid; wherein, upon cooling, said solution undergoes a phase transformation from a liquid crystalline phase to a solid phase containing crystal solvates; and removing solvent from said solid; wherein said shaped article undergoes little or no shrinkage upon removal of said solvent.

16. A method of forming a shaped article from a rigid-chain polymer comprising the steps of:

providing a rigid-chain polymer;

dissolving said polymer in sulfuric acid at a polymer concentration of about 7% to about 10% and a temperature of about 100° C. to 127° C. to form a nematic liquid crystalline solution which will undergo a phase transformation; and forming said solution into a shaped article and cooling said article to form a solid; wherein, upon cooling, said solution undergoes a phase transformation from a liquid crystalline phase to a solid phase containing crystal solvates.

17. A method of forming a shaped article from a rigid-chain polymer comprising the steps of:

providing a rigid-chain polymer;

dissolving said polymer in sulfuric acid at a polymer concentration of about 11% to about 19% and a temperature of about 137° C. to 176° C. to form a nematic liquid crystalline solution which will undergo a phase transformation; and forming said solution into a shaped article and cooling said article to form a solid; wherein, upon cooling, said solution undergoes a phase transformation from a liquid crystalline phase to a solid phase containing crystal solvates.

\* \* \* \* \*